(No Model.) 2 Sheets—Sheet 1.

W. McCAUSLAND.
LIQUID METER.

No. 594,890. Patented Dec. 7, 1897.

WITNESSES
Harry L. Amer
Ces D Kesler

INVENTOR,
William McCausland.
by John Wedderburn
Attorney (No Model.) 2 Sheets—Sheet 2.
W. McCAUSLAND.
LIQUID METER.

No. 594,890. Patented Dec. 7, 1897.

WITNESSES
Harry L. Amer.
Ces. Hesler.

INVENTOR,
William McCausland.
by John Wedderburn
Attorney

United States Patent Office.

WILLIAM McCAUSLAND, OF NEW YORK, N. Y., ASSIGNOR OF ONE-HALF TO CORD EHLERS, OF SAME PLACE.

LIQUID-METER.

SPECIFICATION forming part of Letters Patent No. 594,890, dated December 7, 1897.

Application filed December 31, 1896. Serial No. 617,570. (No model.)

*To all whom it may concern:*

Be it known that I, WILLIAM McCAUSLAND, a citizen of the United States, residing at New York, in the county of New York and State of New York, have invented certain new and useful Improvements in Liquid-Meters; and I do hereby declare the following to be a full, clear, and exact description of the invention, such as will enable others skilled in the art to which it appertains to make and use the same.

My invention relates to improvements in liquid-meters, and has for its object the production of a simple and efficient meter designed to be applied to a spigot or the like.

With this object in view my invention consists in providing a liquid-wheel within an inclosed chamber and in connection with suitable registering mechanism geared to the shaft of the wheel.

Figure 1:
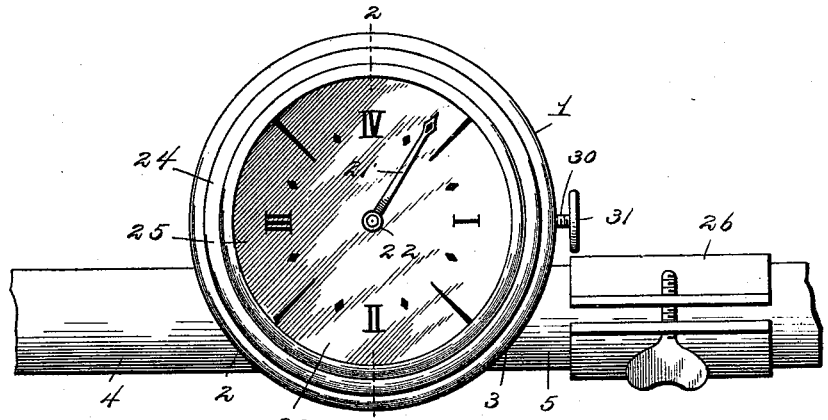
Figure 2:
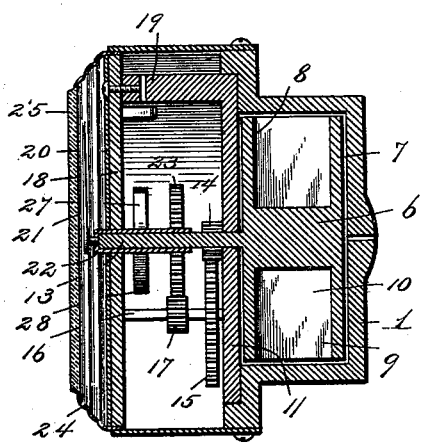
Figure 3:
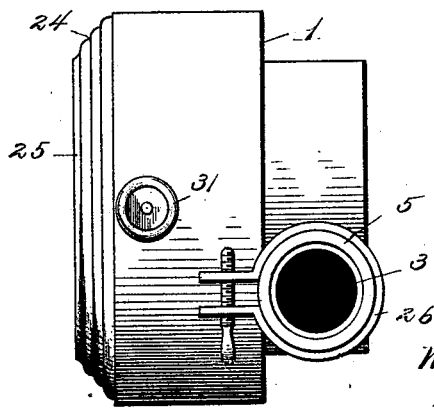
Figure 4:
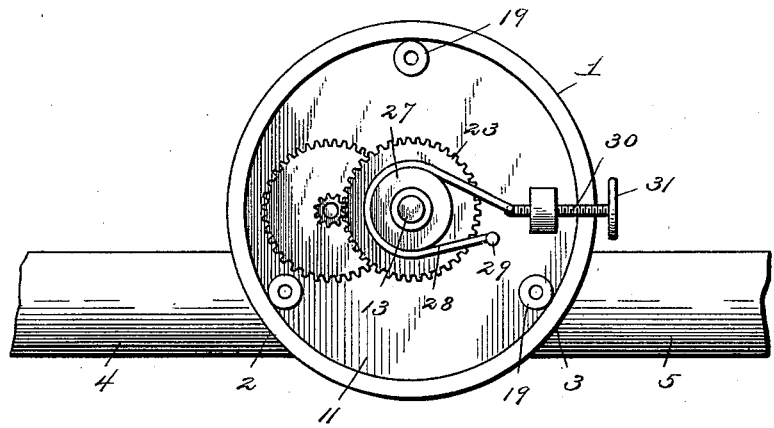
Figure 5:
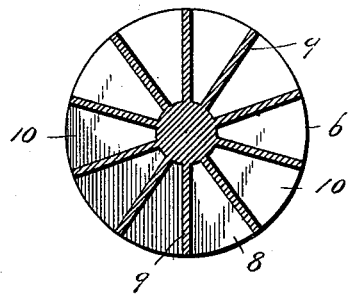
Figure 6:
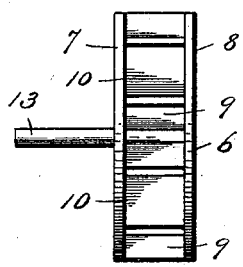

Referring to the drawings, Figure 1 is a top plan view showing my meter attached to a spigot. Fig. 2 is a central vertical section on the line 2 2 of Fig. 1. Fig. 3 is a side elevation of the meter complete. Fig. 4 is a view of the device with the casing and cap-plate removed. Figs. 5 and 6 are detail views of the liquid-wheel detached.

Referring to the numerals on the drawings, 1 indicates the wheel-chamber of my device, provided with bores 2 and 3, in which are inserted a pair of short tubes 4 and 5, as illustrated.

6 indicates a liquid-wheel composed of a pair of parallel disks 7 and 8 and radiating wings 9 at equal distance, defining chambers 10, extending entirely around the liquid-wheel. The wheel 6 is designed to fit closely within the chamber 1 and is retained in place by a disk 11, secured within an annular recess 12 in the inner side of the chamber.

13 indicates the shaft of the liquid-wheel 6, passing through the plate 11 and carrying a pinion 14, meshing with a parallel gear-wheel 15, carried upon a shaft 16, which carries a second pinion 17 and is journaled in suitable bearings in the plate 11 and in a cap-plate 18, secured in its proper relation to the plate 11 by suitable screw-posts 19, as illustrated.

20 indicates a suitable member or scale-dial, of celluloid or other suitable material, secured upon the cap-plate 18, and over the face of which is designed to move an index-pointer 21, carried upon the extremity of the sleeve 22, fitting over the extremity of the shaft 13 and projecting beyond the face of said dial.

23 indicates a gear-wheel keyed upon the sleeve 22 and meshing with the pinion 17.

24 indicates a suitable sheet-metal casing designed to cover the registering mechanism and provided with a crystal 25, through which the movement of the index-pointer may be observed.

26 indicates a suitable clamp carried by the tube 5 and by means of which my meter may be attached to any desired spigot or the like.

The device as described constitutes an operative whole when the liquid to be measured is not under pressure; but in order to accommodate my device to liquids of varying pressure I provide suitable retarding mechanism, which preferably consists of a brake-wheel 27, keyed upon the sleeve 22, and around which is passed a brake-band 28, secured at one end to a stationary post 29 and at its opposite extremity to an adjustment-screw 30, suitably carried within its casing and provided upon the exterior thereof with a thumb-wheel 31.

The operation of my device is as follows: Supposing the meter to have been attached to a spigot through the clamp 26, the liquid will be directed into the wheel-chamber to one side of its center and by its impact against the wings of the liquid-wheel will cause the latter to revolve and permit the escape of the liquid through the tube 4 at the opposite side of the meter. The rotation of the liquid-wheel, which is necessary to the passage of the liquid through the meter, will through the gearing described cause the index-pointer to traverse the dial and to indicate by its position thereon the number of revolutions of the liquid-wheel or the quantity of liquid which is passed through the meter, as the case may be.

I do not desire to limit myself to the details of construction herein shown and described, but reserve to myself the right to change, modify, or vary them at will within the scope of my invention.

Having thus described the invention, what is claimed as new, and desired to be secured by Letters Patent, is—

1. In a liquid-meter, the combination with a liquid-chamber, of a liquid-wheel therein provided with an elongated shaft, a sleeve mounted upon the shaft, mechanism intermediate the shaft and sleeve and designed to cause their rotation in the same direction at different speeds, a brake-wheel carried by the sleeve, a brake-band in contact with the periphery of the brake-wheel, and means for regulating the tension of the brake-band, substantially as specified.

2. In a liquid-meter, the combination with a liquid-chamber, of a liquid-wheel therein, provided with an elongated shaft, a sleeve mounted upon the shaft, an index-pointer operatively connected with the sleeve, and a dial designed to be traversed by the pointer, mechanism intermediate the shaft and sleeve designed to cause their rotation in the same direction at different speeds, a brake-wheel carried by the sleeve, a brake-band in contact with the periphery of the brake-wheel, and means for regulating the tension of the brake-band, substantially as specified.

In testimony whereof I have signed this specification in the presence of two subscribing witnesses.

WILLIAM McCAUSLAND.

Witnesses:
THOMAS RYAN,
GOTTLIEB KULL.